United States Patent
Inge et al.

(10) Patent No.: US 10,286,406 B2
(45) Date of Patent: May 14, 2019

(54) APPARATUS FOR CENTRIFUGAL SEPARATION OF LIQUID PARTICLES FROM A GAS

(71) Applicant: 3NINE AB, Nacka Strand (SE)

(72) Inventors: Claes Inge, Nacka (SE); Peter Franzen, Bandhagen (SE)

(73) Assignee: 3NINE AB, Nacka Strand (SE)

( * ) Notice: Subject to any disclaimer, the term of this patent is extended or adjusted under 35 U.S.C. 154(b) by 176 days.

(21) Appl. No.: 15/510,171

(22) PCT Filed: Oct. 2, 2015

(86) PCT No.: PCT/SE2015/051044
§ 371 (c)(1),
(2) Date: Mar. 9, 2017

(87) PCT Pub. No.: WO2016/056978
PCT Pub. Date: Apr. 14, 2016

(65) Prior Publication Data
US 2017/0297037 A1 Oct. 19, 2017

(30) Foreign Application Priority Data
Oct. 6, 2014 (SE) ...................................... 1451184

(51) Int. Cl.
| | | |
|---|---|---|
| *B01D 45/12* | (2006.01) | |
| *B04B 5/12* | (2006.01) | |
| *B04B 7/02* | (2006.01) | |
| *B04B 11/02* | (2006.01) | |
| *B01D 45/14* | (2006.01) | |
| *F01M 13/04* | (2006.01) | |

(52) U.S. Cl.
CPC ............... *B04B 5/12* (2013.01); *B01D 45/12* (2013.01); *B01D 45/14* (2013.01); *B04B 7/02* (2013.01); *B04B 11/02* (2013.01); *F01M 2013/0422* (2013.01)

(58) Field of Classification Search
CPC ............................... B01D 45/12; B01D 45/14
USPC .......................................... 55/429, 467, 471
See application file for complete search history.

(56) References Cited

U.S. PATENT DOCUMENTS

| | | | |
|---|---|---|---|
| 8,470,062 B2 * | 6/2013 | Herman | ................... F16L 55/24 55/420 |
| 9,670,808 B2 * | 6/2017 | Gorbach | ................... B04B 5/12 |

FOREIGN PATENT DOCUMENTS

| | | |
|---|---|---|
| JP | 48-099770 | 12/1973 |
| JP | 08-089703 | 4/1996 |
| JP | 2003-320381 | 11/2003 |
| WO | 02-34407 A1 | 5/2002 |

* cited by examiner

*Primary Examiner* — Robert A Hopkins
(74) *Attorney, Agent, or Firm* — Mark P. Stone

(57) ABSTRACT

In order to prevent air from being sucked into the separation chamber (12) of a counter-current type of centrifugal separator through the liquid outlet (24) thereof during the normal operation the separator a liquid trap in form of a well (28) is provided in the bottom of the separator housing (10). An outlet conduit (32) opens into the lower part of the well (28), wherein the well (28), at least in its upper part, has a substantially larger cross-sectional area than that of the outlet conduit (32).

5 Claims, 3 Drawing Sheets

APPARATUS FOR CENTRIFUGAL SEPARATION OF LIQUID PARTICLES FROM A GAS

TECHNICAL FIELD

The present invention relates to an apparatus for cleaning of a gas by centrifugal separation of liquid and possible solid particles contained therein, wherein the apparatus comprises a housing; a gas inlet in the housing for uncleaned gas; a rotor rotatably supported in the housing and having a plurality of adjacent surface elements for catching liquid particles in a gaseous flow through the rotor during the rotation thereof and throwing these out towards an inner wall of the housing; an outlet for discharging the gas that has passed through and been cleaned in the rotor; and an outlet in a bottom part of the housing for discharging the liquid collected on and flowing down from the inner wall of the housing.

BACKGROUND OF THE INVENTION

In counter-current types of centrifugal separators for separation of liquid and solid particles from a gaseous medium a negative or sub pressure is created in the separation chamber of the housing. This sub pressure causes the gas to be sucked in through the gas inlet that opens into the separation chamber of the separator housing. The liquid separated in the rotor is thrown out onto the inner wall of the housing and flows by gravity downwardly towards a liquid outlet in the bottom of the separator housing. The liquid is then led to an external container through a hose or pipe conduit. However, the sub pressure in the separation chamber also causes air to flow into the separation chamber through the liquid outlet conduit. This air flow prevents the separated liquid from flowing out through the hose, resulting in a back-flow which gradually fills the separation chamber with liquid until it eventually reaches the rotor and is thrown around. This causes the rotor to be overloaded. In order to prevent this from happening the inner end of the outlet hose has to be immersed below a liquid surface in the separation chamber, such that no air could be sucked in through the outlet hose. However, such a liquid surface is not always available. The hose configuration is also very delicate. If the hose is laid out such that liquid somewhere has to flow upwardly, a further liquid trap is formed which then will prevent the outflow of liquid from the separator. Also, the level of the liquid surfaces present in the separation chamber varies, e.g. when tanks are emptied, whereby the end of the hose suddenly could be located above the liquid surface and prevent flowing out of the liquid.

SUMMARY OF THE INVENTION

In order to eliminate these and other drawbacks of the prior art centrifugal separators of the kind referred to above, it is suggested according to the present invention that the liquid outlet is formed as a well in a lower part of the housing, in the bottom of which a tubular outlet conduit for the separated liquid ends, wherein the well, at least in its upper part, has a substantially larger cross-sectional area than that of the outlet conduit and such a height that it during normal operation of the apparatus forms a durable liquid trap with a substantially constant liquid level thereby preventing air from flowing into the housing through the outlet conduit due to a sub pressure prevailing in the housing. By dimensioning the height of the well such that the liquid column therein corresponds to the maximum sub pressure in the separation chamber there will always be maintained a liquid trap in the well.

When starting up the operation of the separator the separated liquid will flow down along the side walls of the housing and then down into the well in the bottom of the housing, where it initially is prevented from flowing out through the outlet hose due to an inflowing air flow by the created sub pressure in the separation chamber. More and more liquid is collected in the well until the level of the liquid will correspond to the sub pressure prevailing in the separation chamber and an equilibrium is obtained. Then, the inflow of air into the separation chamber is interrupted, such that liquid can flow out through the conduit without flowing back into the separation chamber. As new separated liquid is flowing down into the well, the latter will be emptied by the same amount so that the liquid level therein will be held constant.

The outlet conduit is preferably provided with a vent in its upper part, so that separated liquid can unimpededly flow out to a subsequent container, regardless if the end of the conduit is positioned below a liquid surface or not.

The invention will be described more in detail below with reference to the enclosed drawings.

DETAILED DESCRIPTION OF A PREFERRED EMBODIMENT

Figure 1:
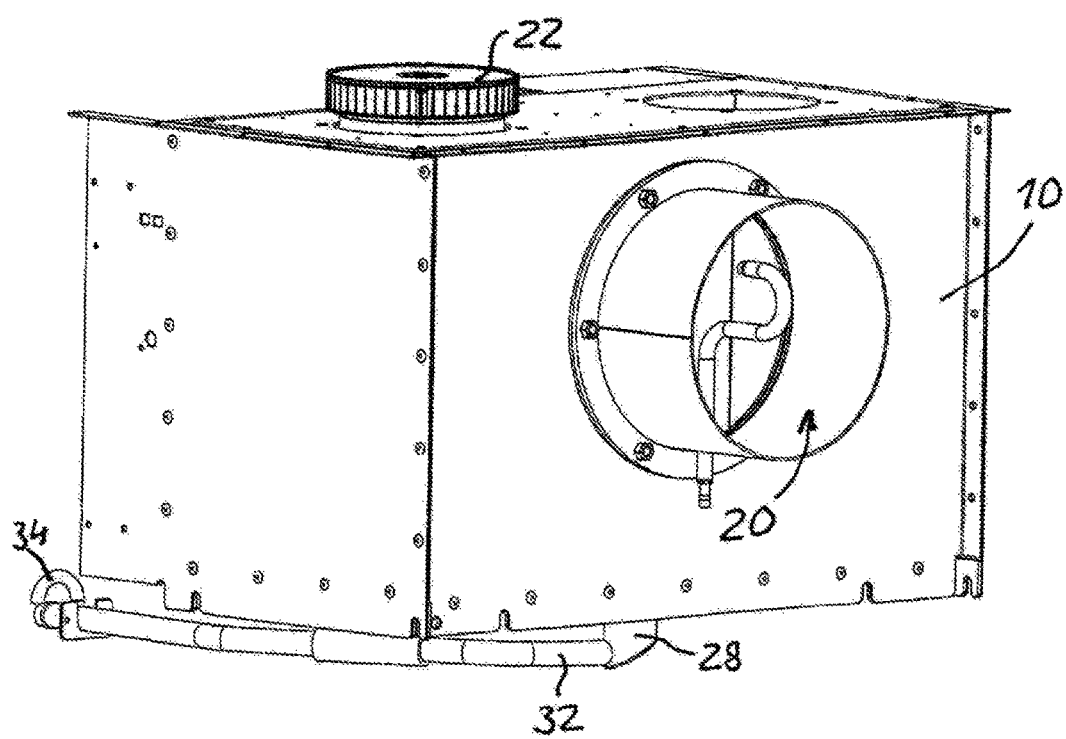
FIG. 1 illustrates the outside of the housing of an apparatus of the invention.
Figure 2:
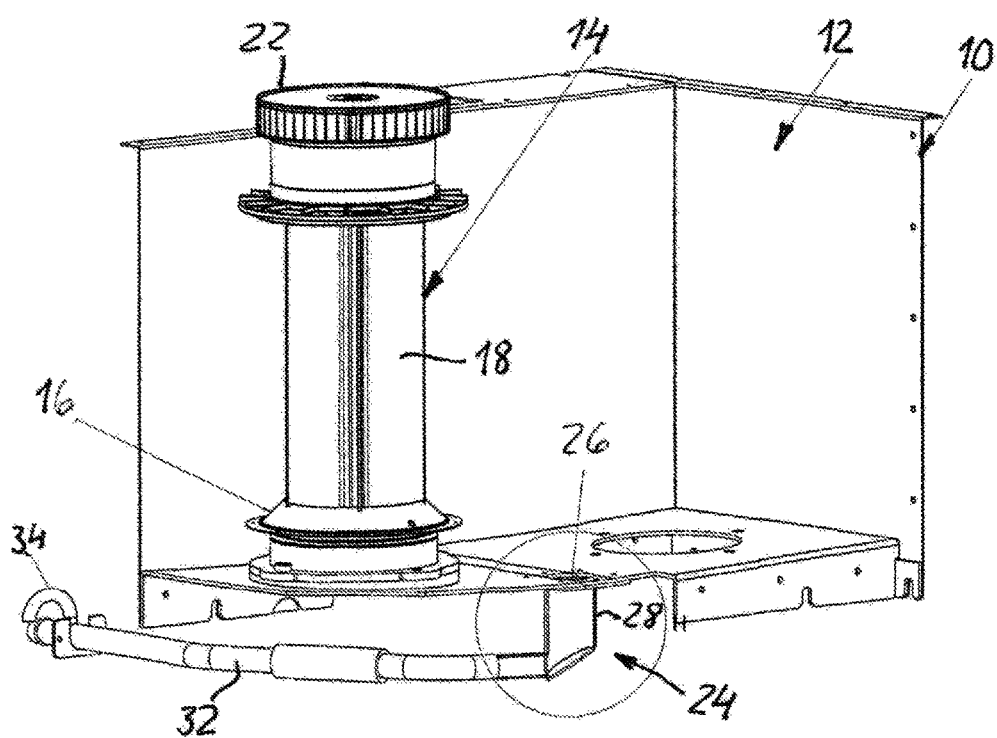
FIG. 2 is a cut out perspective view of the apparatus of the invention.

FIG. 2 shows a cut up portion of an apparatus for cleaning of a gas by centrifugal separation of liquid and possible solid particles contained therein. The apparatus comprises a housing 10 which delimits a separation chamber 12. In this embodiment the housing 10 is adapted to enclose two vertical, rotatably supported rotors 14, only one of which is shown. The rotor 14 has, in a manner known per se, a plurality of sedimentation or surface disc elements 16 separated a small distance from each other. Only one surface element 16 is shown. The surface elements 16 are treaded upon radial spokes 18 of the rotor core and have preferably the shape of conical discs. In one of the side walls of the housing 10 there is an inlet 20 (FIG. 1) for the gas medium to be cleaned from liquid particles. The inlet 20 is oriented substantially perpendicular to the rotor 14. The housing 10 has an upper through-opening (not shown) for the upper part of the rotor 14. A fan wheel 22 at the upper end of the rotor 14 is situated in a fan housing (not shown) above and separated from the separation chamber 12 and generates during rotation of the rotor 14 a sub pressure in the separation chamber 12 via a central outlet shaft for cleaned gas in the rotor 14. The rotors 14 are driven by a common drive motor (not shown) below the housing 10 through a belt.

Figure 3:
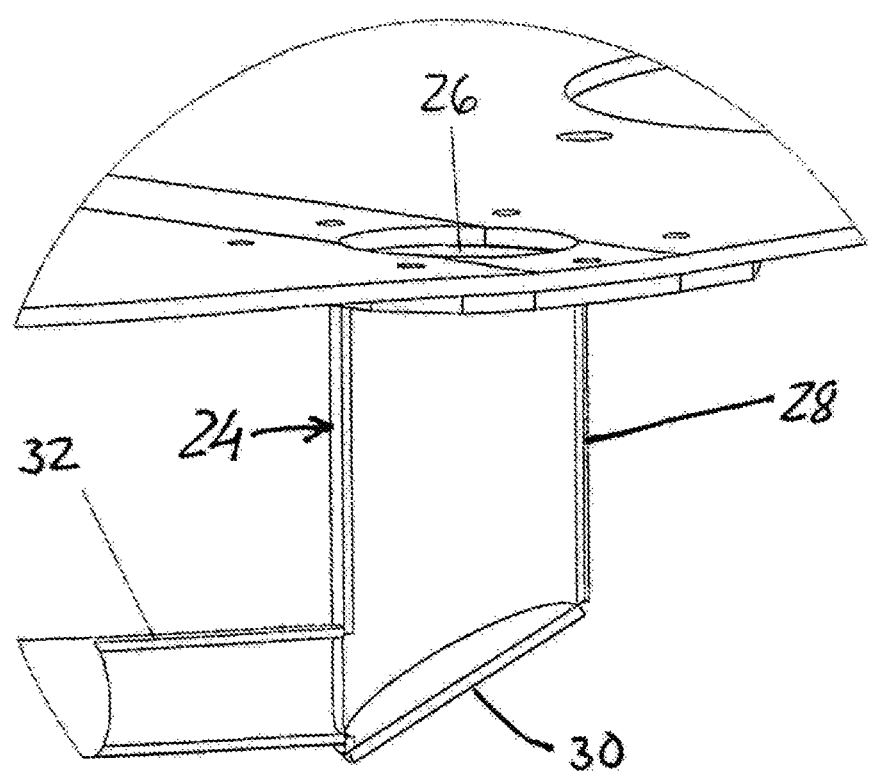
FIG. 3 is an enlarged view of the encircled portion of the liquid trap in FIG. 2.

In a lowest part of the bottom of the housing 10 there is an outlet generally denoted 24 for the liquid separated by the rotors 14. The outlet 24 is formed by a bottom hole 26 (FIG. 3) which opens e.g. into a cylindrically shaped well, in this case a pipe socket 28 with an inclined bottom wall 30. The lower end of the pipe socket 28 communicates with an outlet conduit 32 having a substantially smaller cross-sectional area than that of the pipe socket 28, e.g. a fifth of the cross-sectional area of the pipe socket. The outlet conduit 32 may be formed by a pipe or a hose which leads the separated liquid further to a container or a tank (not shown). Alternately, the outlet 24 may have the form of a bowl or a conical shape.

At the start-up of the operation of the apparatus the gas to be cleaned from liquid or solid particle will be sucked into the separation chamber 12 of the housing 10 through the gas inlet 20 due to the sub pressure generated by the rotation of the fan wheels 22 of the rotors 14. Initially the gas flows into the gaps or interspaces between the conical disc elements 16 of the rotors 14, where the liquid particles in the gas are caught upon the insides of the discs facing the center axis of the rotor 14 by the centrifugal forces acting on the particles during the passage of the gas towards the center of the rotors. The caught particles are forced outwardly towards the outer periphery of the discs 16 by the centrifugal force and are then thrown upon the insides on the housing 10, where they can flow down to the liquid outlet 24 in the bottom of the housing. Initially, the liquid is prevented from flowing out through the outlet conduit 32 due to an air stream flowing in the opposite direction through the conduit created by the sub pressure in the separation chamber 12. More and more liquid is collected in the pipe socket 28 until the liquid level therein corresponds to the sub pressure prevailing in the separation chamber 12 whereby balance or an equilibrium is obtained. Inflow of air into the separation chamber 12 through the outlet conduit 32 is thereby prevented by the liquid in the pipe socket 28, so that liquid can flow out through the conduit 32 without being withdrawn back to the separation chamber 12. As new separated liquid falls down into the pipe socket 28 of the outlet 24, it will be emptied to the same extent so that the liquid level therein will be constant.

The outlet conduit 32 is provided with a vent 34 in an upper portion thereof, such that separated liquid can unimpededly flow out to a subsequent container, regardless if the end of the conduit is positioned below a liquid surface or not.

The invention claimed is:

1. An apparatus for cleaning of a gas by centrifugal separation of liquid and possible solid particles contained therein, said apparatus comprising:
    a housing (10) including a separation chamber (12);
    means for generating a sub-pressure in said separation chamber (12);
    a rotor (14) rotatably supported in the housing (10) and having a plurality of adjacent surface elements (16) for catching liquid particles in a gaseous flow through the rotor during the rotation thereof and throwing these out towards an inner wall of the housing (10);
    a gas inlet (20) for uncleaned gas in a sidewall of the housing and oriented substantially perpendicular to the rotor (14), said gas inlet being separate from a tubular outlet conduit (32) through which separated liquid flows;
    an outlet for discharging the gas that has passed through and been cleaned in the rotor (14); and
    an outlet (24) in a bottom part of the housing (10) for discharging the liquid collected on and flowing downwardly from the inner wall of the housing, wherein the liquid outlet (24) is formed by a well (28) in a lower part of the housing (10), in the bottom of which said tubular outlet conduit (32) for the separated liquid ends, wherein at least the portion of the well (28) adjacent to the lower part of the housing (10) has a larger cross-sectional area than that of the outlet conduit (32) and that said larger cross sectional area portion of said well is at a height such that during normal operation of the apparatus said larger cross sectional area portion of said well forms a durable liquid trap with a substantially constant liquid level thereby preventing air from flowing into the housing through the outlet conduit (32) due to a sub pressure prevailing in the housing.

2. The apparatus of claim 1, wherein the outlet conduit (32) is provided with a vent (34).

3. The apparatus of claim 1, wherein the cross sectional area of the entire well (28) is larger than the cross sectional area of the outlet conduit (32).

4. The apparatus of claim 1, wherein the well (28) is formed by a pipe socket.

5. An apparatus for cleaning of a gas by centrifugal separation of liquid and possible solid particles contained therein, said apparatus comprising:
    a housing (10);
    a gas inlet (20) in the housing for uncleaned gas;
    a rotor (14) rotatably supported in the housing (10) and having a plurality of adjacent surface elements (16) for catching liquid particles in a gaseous flow through the rotor during the rotation thereof and throwing these out towards an inner wall of the housing (10);
    an outlet for discharging the gas that has passed through and been cleaned in the rotor (14); and
    an outlet (24) in a bottom part of the housing (10) for discharging the liquid collected on and flowing downwardly from the inner wall of the housing, wherein the liquid outlet (24) is formed by a well (28) in a lower part of the housing (10), in the bottom of which a tubular outlet conduit (32) for the separated liquid ends, wherein at least the portion of the well (28) adjacent to the lower part of the housing (10) has a larger cross-sectional area than that of the outlet conduit (32) and that said larger cross sectional area portion of said well is at a height such that during normal operation of the apparatus said larger cross sectional area portion of said well forms a durable liquid trap with a substantially constant liquid level thereby preventing air from flowing into the housing through the outlet conduit (32) due to a sub pressure prevailing in the housing, wherein the cross sectional area of the outlet conduit (32) does not exceed $\frac{1}{5}$ of the cross sectional area of the well (28).

* * * * *